Oct. 7, 1958     J. H. BICKFORD ET AL     2,855,149
ELECTRICAL SIGNALING MEANS FOR COUNTERS
Filed July 12, 1956     5 Sheets-Sheet 1

INVENTORS
JOHN H. BICKFORD
BY JOHN D. HEINZMANN

Lindsey and Prutzman
ATTORNEYS

Oct. 7, 1958  J. H. BICKFORD ET AL  2,855,149
ELECTRICAL SIGNALING MEANS FOR COUNTERS
Filed July 12, 1956  5 Sheets-Sheet 2
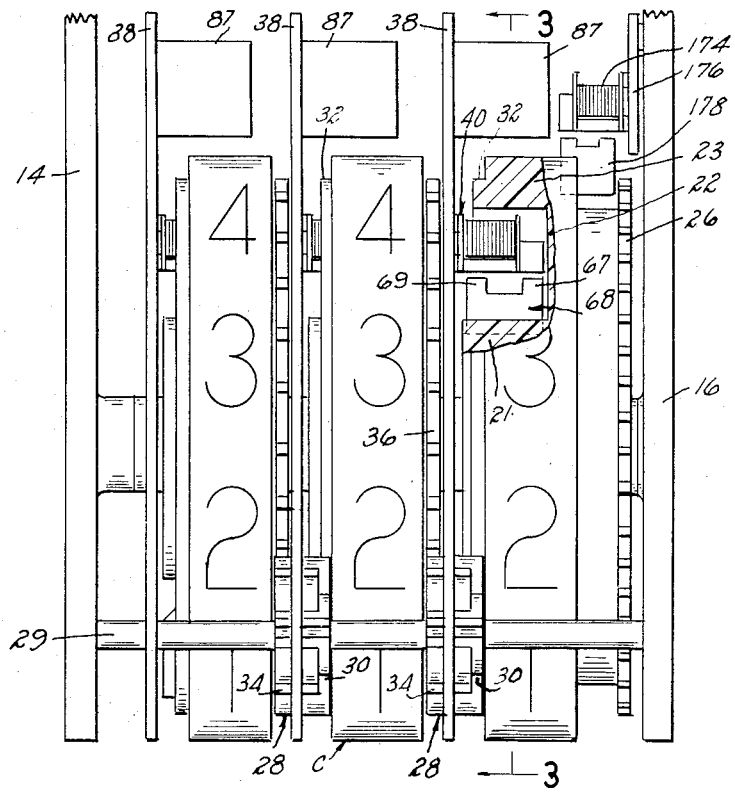
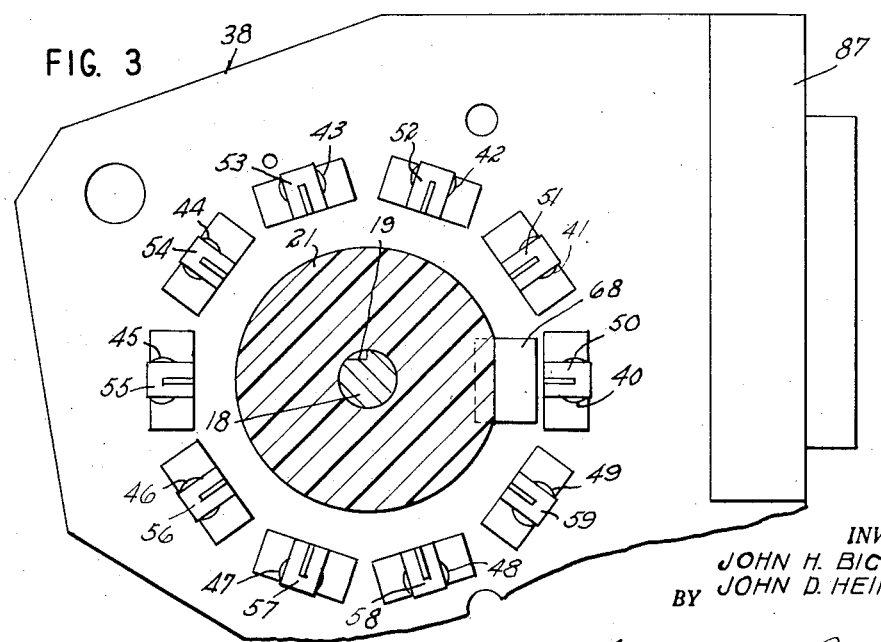
INVENTORS
JOHN H. BICKFORD
JOHN D. HEINZMANN
BY
Lindsey and Prutzman
ATTORNEYS Oct. 7, 1958 J. H. BICKFORD ET AL 2,855,149
ELECTRICAL SIGNALING MEANS FOR COUNTERS
Filed July 12, 1956 5 Sheets-Sheet 3

INVENTORS
JOHN H. BICKFORD
JOHN D. HEINZMANN
BY Lindsey and Prutzman
ATTORNEYS

Oct. 7, 1958      J. H. BICKFORD ET AL      2,855,149
ELECTRICAL SIGNALING MEANS FOR COUNTERS
Filed July 12, 1956      5 Sheets-Sheet 4

INVENTORS
JOHN H. BICKFORD
JOHN D. HEINZMANN
BY
*Lindsey and Prutzman*
ATTORNEYS Oct. 7, 1958   J. H. BICKFORD ET AL   2,855,149
ELECTRICAL SIGNALING MEANS FOR COUNTERS
Filed July 12, 1956   5 Sheets-Sheet 5

INVENTORS
JOHN H. BICKFORD
JOHN D. HEINZMANN
BY
Lindsey and Prutzman
ATTORNEYS

United States Patent Office

2,855,149
Patented Oct. 7, 1958

2,855,149

ELECTRICAL SIGNALING MEANS FOR COUNTERS

John H. Bickford and John D. Heinzmann, Middletown, Conn., assignors to Veeder-Root Incorporated, Hartford, Conn., a corporation of Connecticut Application July 12, 1956, Serial No. 597,497

24 Claims. (Cl. 235—92)

The present invention relates generally to counters and is concerned, more particularly, with new and improved means for producing an electrical signal responsive to a count or number to be registered and to means for translating the electrical signal into a visible indication or registration of the count or number.

While the mechanism of the present invention is not limited for use with gasoline dispensing apparatus, such use is particularly illustrative of the advantages and utility of the invention. In a typical installation of gasoline dispensing equipment, for example, a meter is used to measure the quantity of gasoline delivered and the shaft of the meter is utilized to drive a computer which mechanically registers the quantity and cost of the gasoline dispensed. It is not considered practical to locate the mechanical computer anywhere except closely adjacent the meter in the gasoline dispensing equipment. In the event a remote indication of the registration is desired, it has been proposed heretofore to accomplish this by electrical means, but such proposals have not met with commercial success because of the many problems encountered.

Among the problems which have to be overcome is that there is a limit to the amount of driving power available from the meter and any excess load on the meter will adversely affect the accuracy of the count. A further problem is that gasoline dispensing equipment must withstand long periods of operation and hard use under conditions which are far from optimum such as extreme temperatures, the presence or accumulation of dirt and the presence of moisture, all of which are disadvantageous from an operational standpoint. Another requirement that must be met is that any remote indication of the count cannot be approximate or indefinite and must coincide exactly with the true count at the meter, particularly when the apparatus is stopped at the end of dispensing operation. A further difficulty encountered is that the use of electrical equipment in connection with gasoline dispensing apparatus presents a fire hazard and there are very strict requirements to be met from the standpoint of sparks, arcing, etc. Yet another problem is that there are very definite limits to the apparatus both from a size and cost standpoint since the equipment for producing the electrical signal must fit within the small space available in the housing of the dispensing apparatus and the equipment will not be practical from a commercial standpoint if it is too expensive to fabricate and assemble or install.

The aim of the present invention is to provide electrical signaling means for use in a counting operation which will meet the many technical requirements of such apparatus as indicated above in connection with the gasoline dispensing field. Included in this aim is the provision of such a mechanism which utilizes components which are readily available commercially or can be easily and economically fabricated and assembled. A further aim is to provide a mechanism having a wide field of usage and not necessarily limited to the gasoline dispensing field.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings:

Fig. 2 is a fragmentary enlarged top view of the transmitter portion of the register of Fig. 1 with the cover removed and partially in cross-section to show the internal parts;

Fig. 3 is a fragmentary cross-sectional view taken along the line 3—3 of Fig. 2;

Figure 1:
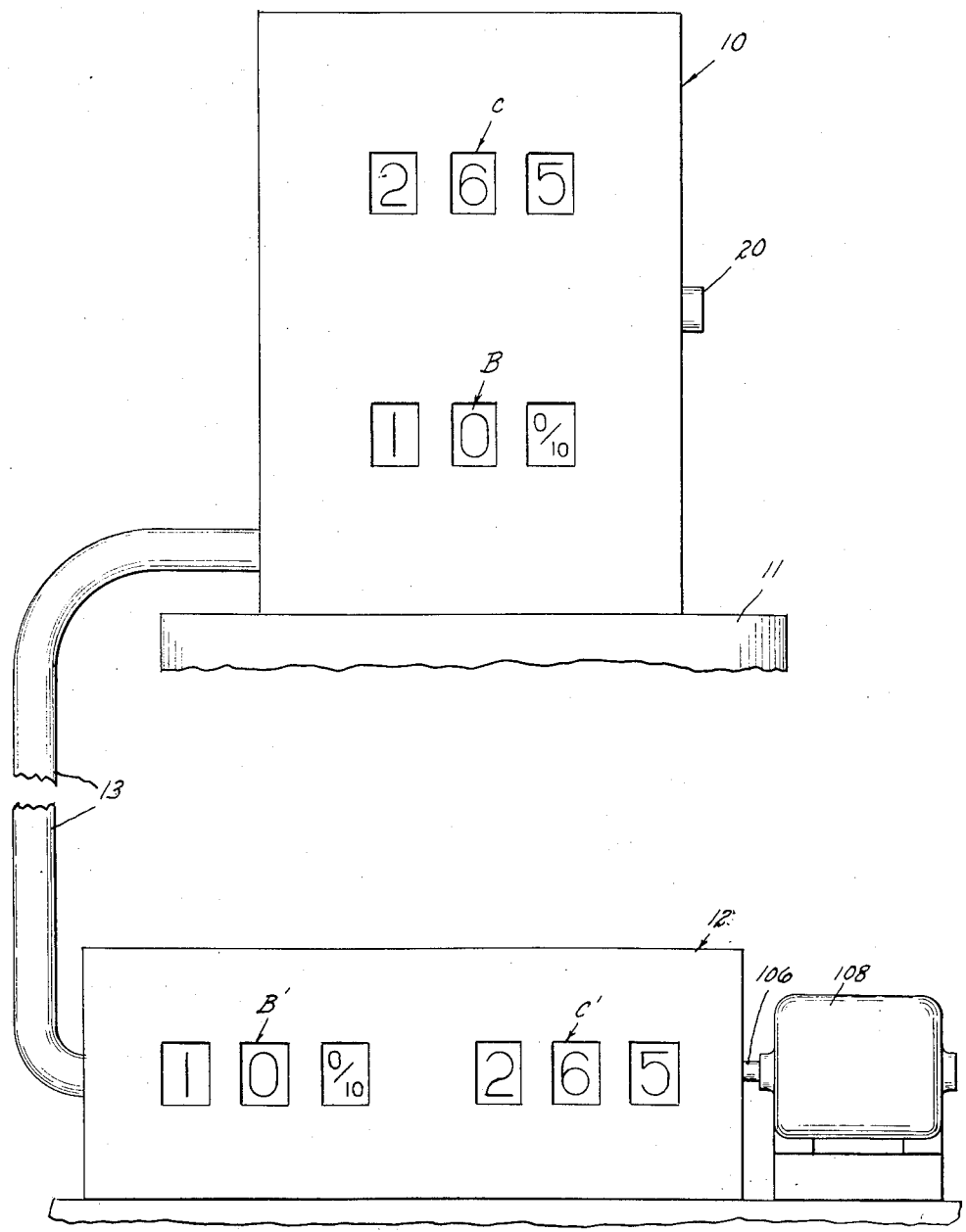
Fig. 1 is a fragmentary front view of the apparatus of the present invention as embodied in a register for use with gasoline dispensing equipment.

Referring to the drawings, the assembly shown in Fig. 1 illustrates an embodiment of the invention to provide a remote reading of the quantity and cost of gasoline dispensed by a gasoline dispensing apparatus. In this embodiment, the transmitter is incorporated in a register 10 having number wheels B indicating the quantity of gasoline dispensed and number wheels C indicating the cost of the gasoline dispensed, the register 10 being driven by the usual speed-change mechanism or variator 11 installed in the usual gasoline dispensing apparatus. The remote reading counter or receiver 12 may be placed at any desired location and is connected to the transmitter solely by the multi-wire electric cable 13. The receiver 12 is provided with quantity number wheels B' and cost number wheels C' corresponding to the number wheels B and C, respectively, of the register 10.

Figure 4:
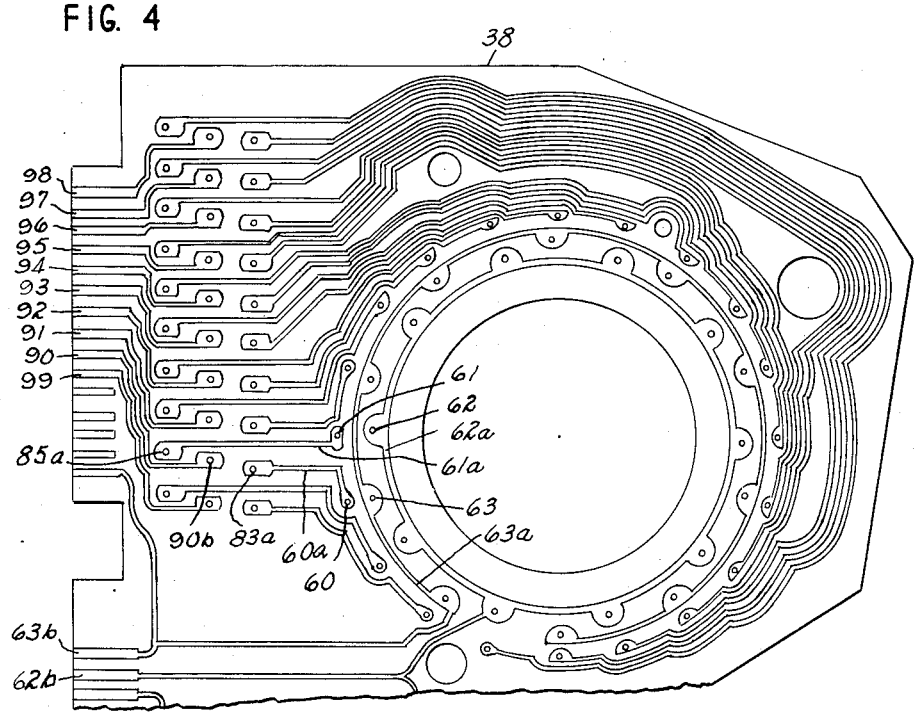
Fig. 4 is a fragmentary side view of the plate of Fig. 2 and showing the reverse side thereof.

With reference to Figs. 2–4, only the portion of the transmitter involving the cost number wheels C is shown and will be hereinafter described, it being understood that the portion of the transmitter involving the quantity number wheels B is similarly constructed. The cost number wheels C are rotatably mounted on a reset shaft 18 supported in a frame having end plates 14 and 16. The reset shaft 18 is provided with a conventional longitudinal reset shaft groove 19 for picking up the reset pawls (not shown) of the number wheels to return the wheels to zero when the reset shaft is rotated as, for example, by turning the coupling 20. A gear 26 coaxial with and connected to the number wheel of lowest order in the usual manner provides a means for driving the counter. The carry-over or transfer of the count from the lowest order number wheel to the next higher wheel is accomplished in a well-known manner by means of a pinion 28 rotatably mounted on a shaft 29 supported in the end plates 14 and 16 with the pinion 28 having a mutilated portion 30 which is engageable with a locking ring 32 on the number wheel of lower order to prevent rotation of the pinion except when the pinion is engaged by a two-toothed gear segment (not shown) on the number wheel of lower order; the pinion 28 also has an unmutilated portion 34 engageable with a driven gear 36 connected to the number wheel of higher order whereby rotation of the lower number wheel through one complete revolution will rotate the number wheel of higher order a distance equal to the advance of one digit thereon. A similar carry-over or transfer arrangement is provided to advance the highest order number wheel by one digit for each complete revolution of the intermediate number wheel.

Turning now to the means for providing an electrical signal of the count at any one time, there is provided in association with each of the number wheels novel electrical means to provide an electrical signal responsive to the rotated position of each number wheel. Inasmuch as the electrical means associated with each number wheel in the specific embodiment are identical, for the purposes of brevity, only the means associated with the number wheel of lowest order will be hereinafter described in detail.

With reference to Fig. 2, a stator plate 38 of nonconducting material is mounted to the left and closely adjacent each of the number wheels. In accordance with the invention, mounted on the stator plate 38 in equally spaced relationship and arranged substantially in a circle concentric with and surrounding the hub 21 of each of the number wheels, are a plurality of reactance coil assemblies 40–49 having saturable cores 50–59, respectively.

In the specific embodiment the coil assemblies are provided with terminals (not shown) which, as in the case of the coil 40, are received in apertures such as 60–63 provided in the stator plate 38 to support the coil unit on the stator plate and further to provide an electrical connection of the coil unit with selected portions of a printed circuit provided on one side of the stator plate, as shown in Fig. 4.

Mounted on the hub 21 of each of the number wheels and supported by the web 22 in spaced relationship thereto is an outer drum 23 which bears the numerals or other indicia of the number wheel. The space between the drum and hub accommodates the stationary reactance coil assemblies 40–49 to form a compact structure. It is to be understood, however, that if a visual indication of the count at the transmitter is not desired, or is unnecessary, the drums 23 may be omitted without departing from the scope of the invention.

In accordance with the invention, it is contemplated that each of the reactance coil assemblies during operation of the counter will be in one of two electrical conditions, namely, one condition wherein the core of the coil assembly is unsaturated whereby the coil assembly will provide a high impedance to the flow of alternating current of given voltage and load therethrough, and a second condition wherein the core of the coil assembly is saturated whereby the impedance effect thereof will be substantially reduced to permit a very substantial increase in current flow therethrough over the unsaturated condition for the same voltage and load.

The invention further contemplates the sequential saturation of the cores of the coil assembly in synchronism with the advance of the count and therefore in accordance with the invention, a magnetic field control means is provided for rotation relative to the coil assemblies in a locus which will result in sequential registry of the magnetic field control means with the cores of the coil assemblies to sequentially drive the cores of the coil assemblies toward saturation thereof. In the specific embodiment, a magnet 68 of the permanent type is mounted on the hub 21, preferably by being imbedded therein, with the pole faces 67, 69 of the magnet facing in the same direction for alignment with the cores of the coil assemblies in sequence as the hub 21 is rotated. The magnet 68 is located so that it comes into alignment with a core concurrently with the registry of a number in the viewing window of the register.

Figure 8:
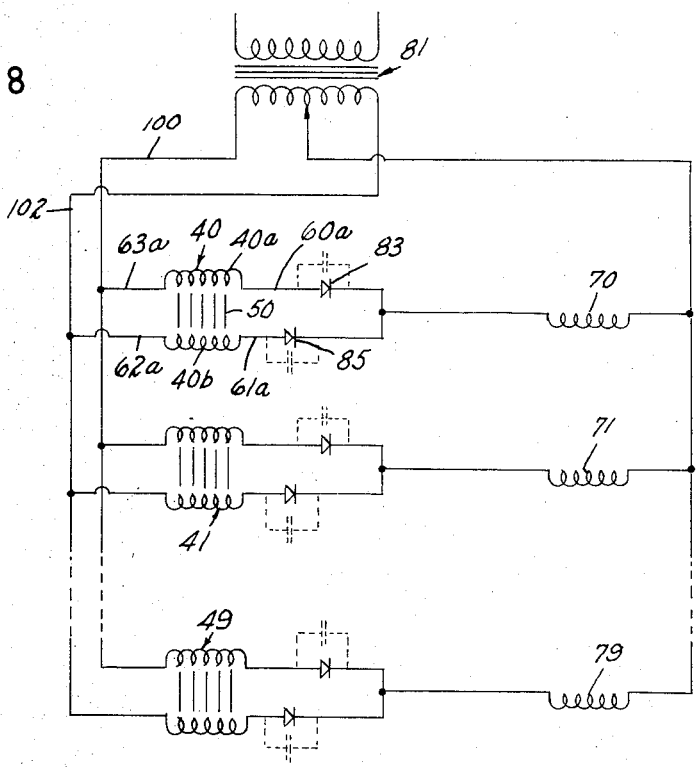
Fig. 8 is a schematic diagram of an exemplary electrical circuit.

In Fig. 8 of the drawings there is illustrated an exemplary electrical circuit for connecting each of the reactance coil assemblies 40–49 in a magnetic amplifier circuit for producing an external electrical signal such as for energizing the solenoids 70, 71 and 79. As will be apparent from the following description, other types of signal receiving elements could be substituted for the solenoids without departing from the scope of the invention. Only the saturable coil assemblies 40, 41 and 49 have been illustrated, it being understood that the remaining coil assemblies 42–48 are also included in the circuit in a similar manner. In accordance with the invention, as schematically shown in Fig. 8, each of the coil assemblies 40–49 is comprised of a pair of coils, which in the case of coil unit 40 are denoted as 40a, 40b, wound on a single closed core 50 and it is preferred that the coils such as 40a, 40b be superimposed one upon the other. One side of each of the coils such as 40a, 40b is connected to one side respectively of the secondary of a transformer 81 which is part of an alternating current source by means of common contact paths 62a and 63a, on the printed circuit, illustrated in Fig. 4 leading to coil assembly terminal contact points 62b, 63b respectively. As can be seen in Fig. 8, the other end of each of the coils is in the specific embodiment respectively connected to a pair of rectifiers 83, 85 of the contact type, which are arranged to pass current in the same direction through both coils 40a, 40b and both of which are connected in series with the solenoid 70. In the specific embodiment shown, the rectifiers 83, 85 are enclosed within a housing 87 mounted on the stator plate 38 as shown in Figs. 2 and 3 and terminals (not shown) are provided on the rectifiers for engagement in apertures, such as 83a, 85a in the stator plate 38 for electrical connection of one side of each of the rectifiers with current paths such as 60a and 61a, respectively, to provide a current path to one side of each of the coils such as 40a, 40b respectively. A plurality of current paths 90–99 are provided on the stator plate forming a connection with the other side of the rectifiers by means of engagement of a terminal common to each pair engaged in an aperture such as 90b in the stator plate. The outer terminals of current paths 90–99 are utilized to make connection with the external signaling means such as solenoids 70, 71 and 79.

In accordance with the invention, it has been found that the circuit as described in Fig. 8 has many advantages which it is believed will be apparent from a description of the operation thereof. Only the portion of the circuit associated with the coil assembly 40 will be described, it being understood that the remaining portions of the circuit function similarly. It will be assumed that the positive half cycle of the alternating current supplied from the transformer 81 will flow in the line 100, while the negative half cycle of the alternating current will flow in the line 102. With this assumption and with the supply current in the positive half cycle, current will flow through the coil 40a through the rectifier 83 and through the solenoid 70 back to the center-tap of the transformer. During the negative half cycle current will flow through the line 102, coil 40b, rectifier 85 and thence through the solenoid 70 to the center tap of the transformer 81. Thus it can be seen that the current output of the saturable reactor-rectifier combination is a full wave rectified direct current. With the magnet 68 out of registry with the coil assembly 40 the current flow through the coils 40a, 40b will be at a relatively low value due to the high impedance of the coils when the core 50 is in the unsaturated condition and will be insufficient to operatively energize the solenoid 70. On the other hand, when the magnet 68 is in registry with the core 50 the core will become saturated, thus effectively lowering the impedance of the coil assembly 40 to permit a substantially greater flow of current through the coils 40a, 40b sufficient to operatively energize the solenoid 70.

It is desired that when the magnet 68 is moved out of registry with the coil unit 40 the current through the coils 40a, 40b be immediately reduced to de-energize the solenoid such as 70 prior to the energizing of the next succeeding solenoid such as 71. Therefore, in accordance with the invention, capacitance means are connected in series with each of the coils 40a, 40b to provide a nonlinear resonant circuit having a resonant frequency when the magnet 68 is not in registry with the coil assembly 40 which is less than the frequency of the alternating current source.

As is well known to those skilled in the art, a characteristic of a nonlinear resonant circuit is that the current passing through the circuit for a given applied voltage will increase as the frequency of the applied voltage is increased until the resonant frequency of the circuit is reached whereupon a further increase in the frequency of the applied voltage will result in a sharp drop in the current through the circuit to a very low level. Thus, with the coil unit 40 in an unsaturated condition, the current permitted to flow therethrough is maintained at a very low value by the connection of the coils 40a, 40b in a nonlinear resonant circuit.

When the magnet 68 is in registry with the coil assembly 40, the effective impedance of the coil assembly is substantially reduced resulting in a change in the resonant frequency of the circuit to a point above the frequency of the alternating current source, and it might be said that the nonlinear resonant characteristic of the circuit is eliminated when the magnet is in registry with the coil assembly. When the magnet is subsequently moved out of registry with the coil assembly the nonlinear resonant characteristic of the circuit heretofore mentioned is immediately again apparent, and the current through the coils 40a, 40b will be almost instantaneously reduced as the impedance of the coils is increased to provide a resonant frequency of the circuit below the frequency of the alternating current source, thus in accordance with the invention, providing a sharp on-off operation of the circuit.

To provide a nonlinear resonant circuit as described, capacitors may be provided as shown in dotted lines in Fig. 8 connected in parallel with the rectifiers 83, 85. It has been found, though, in accordance with this invention, that if selenium rectifiers are utilized for the rectification of the alternating current passed through the coil units, the capacitance effect of such rectifiers is in itself sufficient and may be utilized with proper tuning of the coils such as 40a, 40b to provide the nonlinear resonant circuit desired.

It should be noted that the provision of two coils such as 40a, 40b on a single core such as 50 obviates the necessity for a separate flux resetting coil on the core to reset the flux in the core to zero upon a change in polarity of the alternating current source which resetting is desirable to improve the over-all efficiency of the circuit.

It is preferred that the frequency of the alternating current source be in the radio frequency range of from 1 to 20 kilocycles and in the specific embodiment a frequency of approximately 15 kilocycles is utilized. By the use of a high frequency current source it is possible to maintain the size of the coil assemblies such as 40 compatible with the compact installation requirements of a counter. Further the use of a high frequency current source minimizes the magnetic forces required to saturate the coil assembly thus allowing the use of a relatively small magnet and accordingly minimizing the power required from the driving mechanism such as a gasoline pump flow meter.

A distinct advantage of the arrangement just described is that the rotation of the permanent magnet 68 does not generate the electrical current but merely renders the coil assemblies conductive so that there is very little drag or load on the driving mechanism thus further reducing the power required from the driving mechanism. It also will be noted that there is no opening or closing of any circuits so that the system is completely spark-free and there are no contacts to wear or get dirty, thus assuring trouble-free operation.

Turning now to the receiver portion 12 of a remote reading counter installation constructed in accordance with the invention; and as shown in Figs. 1, 5, 6, 7 and 9, the number wheels B' and C' previously referred to are supported on a shaft 106 which is continually rotated by an electric motor 108. Only the portion of the receiver concerned with the number wheels C' will be described in detail since it will be understood that the portion concerned with number wheels B' is identical. The shaft 106 extends through a frame 110 having end walls 112, 114, base plate 116 and a top cover plate 118. In the specific embodiment, the shaft 106 is rotated by motor 108 in a counterclockwise direction as viewed in Fig. 6. Each of the number wheels C' is yieldingly connected to the shaft 106 for rotation therewith by means of a suitable yieldable drive which in the specific embodiment shown is comprised of a rubber washer 120 disposed between the shaft and the hub 122 of each of the number wheels as indicated in the right-hand or lowest order wheel of Fig. 5.

Figure 5:
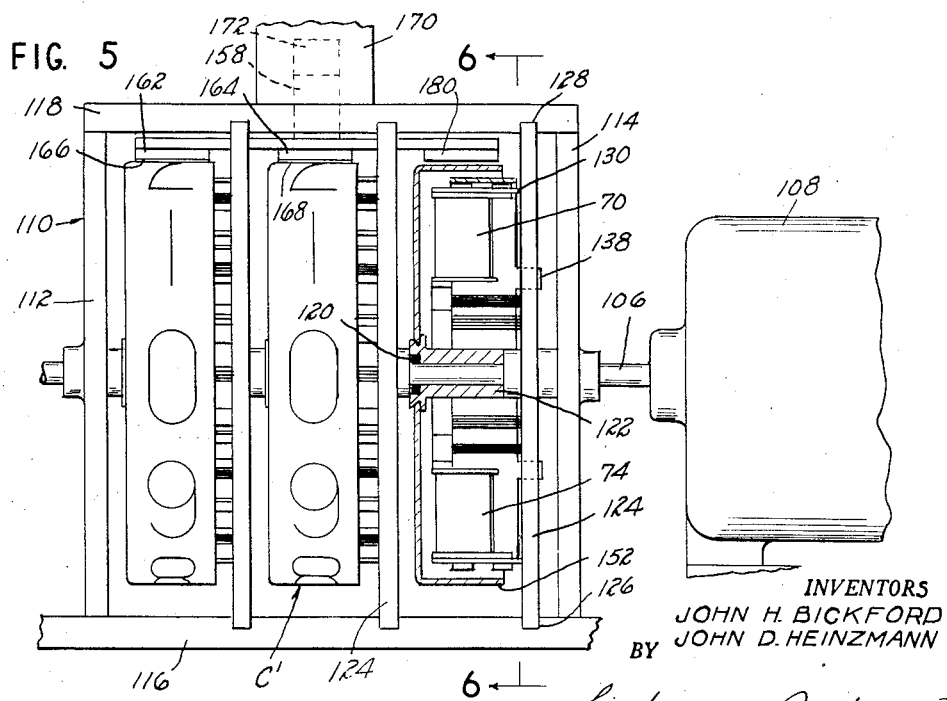
Fig. 5 is a fragmentary enlarged front view of the receiver portion of the register of Fig. 1 with the casing removed and partially in cross-section to show the internal parts.

The means provided in the receiver to position the number wheels in rotated positions corresponding to the count at any one time in response to the electrical indications from the reactance coils of the transmitter are the same for each wheel; accordingly, in the interest of brevity only the positioning means associated with the number wheel of lowest order will be specifically described. With reference to Figs. 5 to 7 and 9, stator plates 124 are mounted in the frame 110 in slots 126 and 128 in the base 116 and top plate 118, respectively. A plurality of circularly arranged solenoids 70-79 corresponding to the solenoids described above in connection with the schematic diagram of Fig. 8 are mounted on the stator plate substantially concentric with the shaft 106. The solenoids such as 70, as can be seen in Figs. 5 and 7, are supported on the stator plate by means of a pair of legs such as 130, 132 extending through apertures 134, 136 in the stator plate and also by a portion of the core of the solenoids which extends through the stator plate as at 138 in the case of the solenoid 70. One of the supporting legs, such as 130, of each of the solenoids is connected to one end of the coil of the solenoid and also makes contact, as shown in Fig. 7, with a circuit path such as 140 of a plurality of paths 140, 149 of a printed circuit disposed on one side of the stator plate 124. The other of the legs of the solenoids, such as 132, makes contact with a current path 150 of a pair of common circuit paths 150, 151 of the printed circuit. Thus, terminals have been provided for use with the multi-wire cable 13 to respectively connect one side of each of the solenoids with the circuit paths 90-99 on the stator plate 38 in the transmitter and to connect the other side of the solenoids through the paths 150, 151 to the alternating current source in a circuit such as shown in Fig. 8 whereby the solenoids 70-79 will be sequentially energized in synchronism with registry of the permanent magnet 68 of the transmitter with the reactance coil assemblies 40-49.

Figure 6:
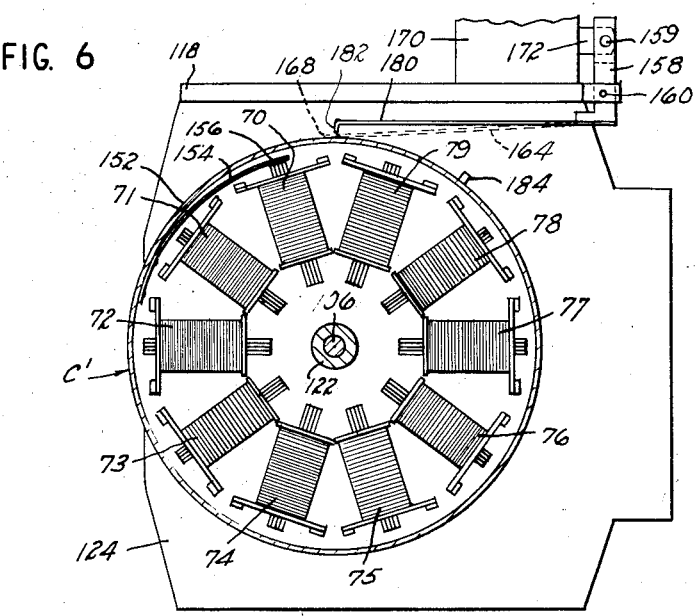
Fig. 6 is a fragmentary cross-sectional view taken along the line 6—6 of Fig. 5.
Figure 7:
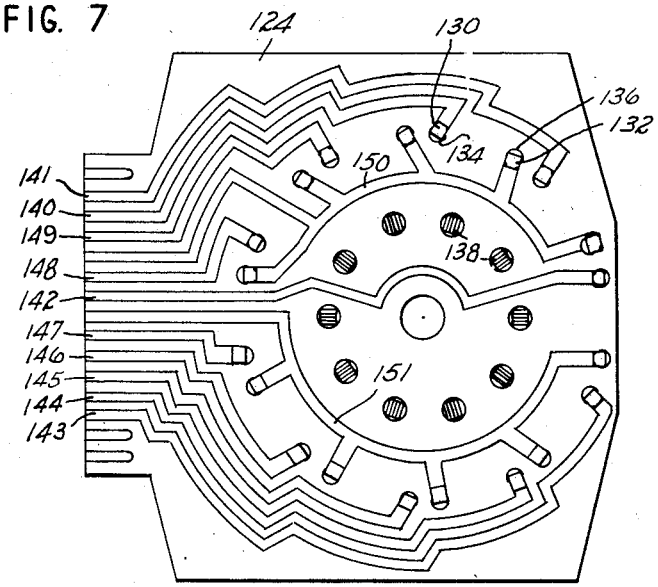
Fig. 7 is a side view of the plate of Fig. 6 showing the reverse side thereof.

With reference to Fig. 6, in accordance with the invention, mounted on the inner periphery of the drum 152 of the lowest order number wheel for rotation therewith is an elongated flexible armature member 154 preferably formed of a resilient non-magnetic material such as copper and having an end portion 156 of magnetizable metal such as steel. When a solenoid such as 70 is energized, the end 156 of the armature 154 will be attracted into engagement with the core of the solenoid, as can be seen in Fig. 6, and rotation of the lowest order number wheel with the shaft 106 is thus prevented, causing the wheel to slip on the shaft as permitted by the yieldable drive therebetween. As the solenoid 70 is de-energized, the armature will spring towards the periphery of the number wheel, and inasmuch as the wheel is not now prevented from rotating, the friction drive between the continuously rotating shaft and the wheel will cause the wheel to advance in a counterclockwise direction as viewed in Fig. 6. The sequential energizing of the solenoid 71 will, as the end 156 of the armature member 154 passes into registry therewith, cause the armature member to flex and the end thereof will be engaged with the core of the solenoid 71 to prevent rotation of the number wheel as long as the solenoid 71 remains energized. Thus, means are provided to discretely advance the number wheel in accordance with the sequential energizing of the solenoids 70 to 79. As can be seen, in accordance with the invention, the armature member 154 engages the core of one of the solenoids 70-79 only when the solenoid is energized and does not frictionally engage any member during advance of the wheel, thus eliminating any frictional resistance to rotation of the number wheel by the shaft 106.

In accordance with the invention, it is preferred that the main portion of the armature member be relatively long to provide the flexibility desired and further, it is preferred that the end portion 156 be relatively small to assure accuracy of positioning of the number wheel. The fabrication of the main portion of the armature of non-magnetizable material, with only the end 156 being of magnetizable metal, assures that the armature will not be attracted toward the magnets as it passes thereby until the end 156 is in substantial registry with an energized magnet, thus precluding the stopping of a number wheel at an erroneous reading.

It is further preferred that when the magnet 68 of the transmitter portion passes from registry with one coil assembly 40-49 to the next coil assembly, the core of the first coil assembly remains in a saturated condition sufficient to maintain the corresponding solenoid 70-79 of the receiver energized until such time as the next coil assembly is in condition to energize the next succeeding solenoid in the receiver to assure under normal conditions that the number wheels C' will be maintained under the control of the solenoids 70-79. An important advantage of this construction is that although the armature 154 is normally spaced from the solenoids to permit frictionless travel, it is moved into engagement with whichever solenoid is energized to position the number wheel, thus multiplying the effective holding power of the solenoid which varies with the square of the distance. Thus, very much smaller solenoids can be used to control the wheel.

Figure 9:
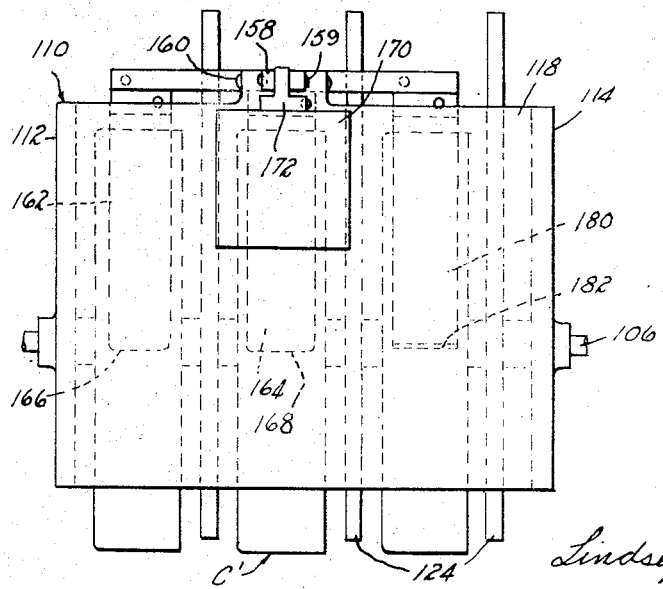
Fig. 9 is a fragmentary top view of the receiver with the casing removed.

It has been found because of electrical and manufacturing tolerances in the receiver and transmitter, and because the number wheels of the receiver are not interconnected, that during a transfer or carry-over of the number wheels of the receiver the advance of the number wheels of the receiver may not take place at exactly the same instant so that in the event the register were stopped while a transfer was taking place, there might appear an erroneous or at least ambiguous final reading at the receiver. Therefore, in accordance with the invention, cooperating means have been provided on the transmitter and receiver to assure that the number wheels of the receiver will simultaneously advance during a carry-over or transfer movement thereof. In the specific embodiment, a lever 158 is pivotally mounted on the plate member 118 of the receiver as at 160 as shown in Figs. 5, 6 and 9, and a pair of brake arms 162, 164, preferably fabricated from a resilient material such as spring steel, are mounted on the lever 158 with their end portions 166, 168, respectively, overlying and normally spaced from, but engageable with the periphery of the number wheels of higher order, respectively. A solenoid 170 is mounted on the top plate member 118 and is provided with an armature 172 which is pivotally connected to the lever 158 as at 159 and which is movable leftwardly as viewed in Fig. 6 upon energizing of the solenoid to effect movement of the lever 158 in a counterclockwise direction as viewed in Fig. 6. Such movement of the armature 172 engages the end portions 166, 168 of the brake arms 162, 164 with the number wheels to prevent rotation thereof. Spring means (not shown) within the solenoid 170 provides movement of the armature 172 in a rightward direction as viewed in Fig. 6, upon de-energizing of the solenoid to move the lever 158 in a clockwise direction, thus lifting the brake arms 162, 164 out of engagement with the number wheels of higher order.

In accordance with the invention, the solenoid 170 is controlled by means of a saturable core reactance coil assembly 174 in the transmitter similar to the assemblies heretofore described and which, as can be seen in Fig. 2, is mounted on a stator plate 176 fixed to the end plate 14 of the transmitter adjacent the number wheel of lowest order. The reactance coil assembly 176 is connected in a circuit similar to that heretofore described in connection with the coil assemblies 40, etc. The rectifiers therefor may be contained in the housing 87 along with the rectifiers for coil assembly 40-49. A permanent magnet 178 is embedded in the drum 23 of the number wheel of lowest order for rotation therewith, and in accordance with the invention, the magnet 178 and the coil assembly 174 are located so that the magnet will register with the reactance coil assembly just prior to the carry-over of the count from the number wheel of lowest order to the number wheel of next higher order which in the specific embodiment occurs as the number wheel of lowest order passes from 9 to 0. In the specific embodiment, for example, the magnet 178 will be in registry with the coil assembly 174 as the number wheel of lowest order registers approximately 9.7 to provide a relatively high current flow through the coil assembly sufficient to energize the solenoid 170 and prevent the number wheels of higher order of the receiver from rotating for a predetermined interval prior to and during the carry-over of the count to assure that neither of the said number wheels will advance prematurely. Then, as the magnet 178 passes beyond the coil assembly 174, the solenoid 170 is de-energized and the number wheels of higher order are simultaneously released for advancement to the next higher count.

In the practice of the invention, it has been found that when the transmitter is driven at a high rate of speed, the momentary energizing of the solenoids 70-79 associated with the lowest order number wheel of the receiver may be insufficient for the solenoids to retain control of the number wheel, which accordingly will rotate with and at approximately the same speed as the shaft 106. This is of no particular consequence during such high-speed operation of the transmitter, as the shaft in the preferred embodiment is rotated at approximately 40 R. P. M. to provide a desirable rapid advance of the number wheels, thereby resulting in the lowest order number wheel being rotated at approximately 400 counts per minute which will, of course, render the lowest order number wheel unreadable. However, when the speed of the transmitter is reduced, such as might occur at the end of a gasoline dispensing operation, the solenoids 70-79 will regain control of the number wheel of lowest order and properly position the same.

In order to assure that a carry-over of the number wheel of lowest order will occur simultaneously with the advance of the number wheels of higher order in the receiver, there is provided a stop arm 180 mounted on the lever 158 and provided with a turned over end portion 182 which is engageable with stop member on lug 184, on the number wheel of lowest order. The lug 184 is disposed on the number wheel in an angular position which will assure that it will be engaged by the stop arm 180 at the transfer position provided the solenoid 170 is energized by registry of the magnet 178 with the coil assembly 174 of the transmitter.

Therefore, it can be seen that if the transmitter is being driven at a relatively low rate of speed, the energizing of the solenoid 170 as described above will result in engagement of the stop arm 180 with the lug 184 prior to carry-over between the number wheels of lowest order and the next higher order number wheel to assure that the carry-over movement of all of the wheels will take place simultaneously. It should be noted that the stop arrangement for the number wheel of lowest order assures that if the number wheel is drifting, as described above, during high speed counting, the sudden stopping of the counter at a point where the coil assembly 174 is in the saturated condition will not cause rotation of the lowest order number wheel to be impeded at an erroneous reading as might be the case if friction brake arms such as 162, 164 were used.

As previously mentioned, the transmitter portion of the apparatus is resettable to zero in the usual manner employed to reset a number wheel type of counter. It is an advantage of the present invention that no separate resetting mechanism is required to reset the receiver to zero since the number of wheels of the receiver will automatically follow the number wheels of the transmitter and thus will be simultaneously reset to zero.

While the invention has been described specifically above for use, by way of example, in gasoline dispensing equipment, it will be understood that the transmitter or receiver or both are susceptible to other uses, all within the scope of the invention.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

We claim:

1. In a counting device, a movably mounted magnet, means for moving the magnet during a counting operation in response to advance of the count, a plurality of reactance coil assemblies each having a saturable core mounted and arranged for registry sequentially with the magnet as the magnet is moved during a counting operation, the magnetization level of the cores of said coil assemblies being shifted toward saturation by the magnet when the magnet is moved into registry therewith, electric circuit means for connecting the coil assemblies to a source of electrical current, and means responsive to a flow of current through the coil assemblies.

2. In a counting device, means for providing an indication of the count comprising a plurality of circularly arranged reactance coil assemblies each having a saturable core, magnetic field control means to sequentially shift the magnetization level of the cores of said coil assemblies toward saturation comprising a permanent magnet mounted for rotation through a registering position relative to each of said coil assemblies in sequence, means for rotating the magnet during a counting operation, and indicating means electrically connected to said coil assemblies.

3. In a counting device, means for providing an indication of the count comprising a plurality of circularly arranged reactance coil assemblies each having a saturable core, magnetic field control means to sequentially shift the magnetization level of the cores of said coil assemblies toward saturation comprising a permanent magnet mounted for rotation through a registering position relative to each of said coil assemblies in sequence, means for rotating the magnet during a counting operation, and an indicator having a plurality of control solenoids respectively connected in series with said coil assemblies.

4. In a counting device, means for providing an electrical signal responsive to the count comprising a plurality of reactance coil assemblies each having a saturable core, and means for sequentially shifting the magnetization level of the cores of the coil assemblies toward saturation comprising magnetic field control means mounted for sequential movement through registry relative to each of said coil assemblies, and driving means to move said control means in response to advance of the count.

5. In a counting device, means for providing an electrical signal responsive to the count comprising a plurality of circularly arranged reactance coil assemblies each having a saturable core, and magnetic field control means to sequentially shift the magnetization level of the cores of said coil assemblies toward saturation comprising a permanent magnet, means mounting the magnet for rotation through a registering position relative to each of said coil assemblies in sequence, and means to advance the magnet in response to advance of the count.

6. In a counting device, means adapted to provide an electrical signal responsive to the count comprising a rotatable number wheel, a stator plate, a plurality of circularly arranged reactance coil assemblies mounted on the stator plate substantially concentric with the axis of the number wheel, each of said coil assemblies having a saturable core, and a permanent magnet mounted for rotation with the number wheel through a registering position relative to each of said coil assemblies to sequentially shift the magnetization level of the cores of the coil assemblies toward saturation in sequence during rotation of the number wheel.

7. In a counting device, means for providing an electrical signal responsive to the count comprising a rotatable member adapted to be driven in response to the count, a permanent magnet carried by said rotatable member, a stator plate extending transversely of the axis of rotation of the rotatable member, a plurality of circularly arranged reactance coil assemblies mounted on the stator plate for registry sequentially with the magnet as the rotatable member is rotated, each of said assemblies having a saturable core whose magnetization level is shifted toward saturatiton by the permanent magnet, and a printed circuit on the stator plate for connecting the coil assemblies individually to a source of electric power.

8. In a counting device, a first set of number wheels, a plurality of circularly arranged reactance coil assemblies adjacent each of the wheels, each of the coil assemblies having a saturable core, a permanent magnet secured to each number wheel for rotation through a registering position relative to the associated coil assemblies to sequentially shift the magnetization level of the cores toward saturation during a counting operation, a second set of number wheels corresponding to the first set of number wheels, and means for rotatably positioning the second set of number wheels responsive to the position of the first set of number wheels including a plurality of solenoids respectively connected in series with said coil assemblies.

9. In a counting device, a first set of number wheels, a plurality of circularly arranged reactance coil assemblies associated with each of the wheels, each assembly having a saturable core, a permanent magnet fixed to each number wheel for registry sequentially with the coil assemblies as the number wheel is rotated for shifting the magnetization level of the cores toward saturation, a second set of number wheels corresponding to the first set of number wheels, an electric motor for rotating the second set of number wheels and having a yielding drive connection therewith, an armature carried by each of the second set of number wheels, and a plurality of circularly arranged solenoids associated with each of the second set of number wheels cooperable with the armature to halt the number wheel, said solenoids being connected electrically with the reactance coil assemblies.

10. In a counting device, means adapted to provide an electrical signal responsive to the count comprising, a plurality of reactance coil assemblies each having a saturable core, means for sequentially shifting the magnetization level of the cores of the coil assemblies toward saturation comprising magnetic field control means mounted for movement through a registering position relative to each of said coil assemblies, driving means for moving said control means in response to advance of the count, means to connect one side of each of said coil assemblies to an alternating current source, and means connecting the other side of each of said coil assemblies in a series connected non-linear resonant circuit tuned to a resonant frequency when the control means is out of registry with the coil assembly which is substantially less than the frequency of the alternating current source.

11. In a counting device means adapted for providing an electrical signal of the count comprising a plurality of reactance coil assemblies, each comprising a reactance coil wound on a saturable core, means to connect one side of each coil to an alternating current source, means connecting the other side of each coil in series with a selenium rectifier, each coil of said reactance coil assemblies being tuned relative to the capacitance effect of the selenium rectifier to provide a non-linear resonant circuit having a resonant frequency substantially below the frequency of said alternating current source, and means to sequentially shift the magnetization level of the cores of said reactance coil assemblies toward saturation comprising magnet field control means, means mounting said control means for movement through registering position relative to each of said cores, and drive means to move said control means in response to the count.

12. In a counting device, means adapted to provide an electrical signal of the count comprising, a plurality of reactance coil assemblies, each coil assembly comprising a pair of reactance coils both wound on a single closed saturable core, means to connect one side of each coil of said pair to an alternating current source, means connecting the other side of each coil of said pair to rectifying means arranged to provide current flow of said alternating current source in one coil when said alternating current source is of one polarity and in the other coil when of the other polarity, and means to sequentially shift the magnetization level of the cores of said coil units toward saturation in response to advance of the count.

13. In a counting device, means to provide an electrical signal of the count comprising, a plurality of reactance coil assemblies each comprising a pair of reactance coils both wound on a single closed saturable core, means to connect one side of each coil in said pair to an alternating current source, a selenium rectifier connected in series with the other side of each coil of said pair, each of said coils being tuned relative to the capacitance effect of the rectifier associated therewith to provide a nonlinear resonant circuit having a resonant frequency substantially below the frequency of said alternating current source, and means to sequentially shift the magnetization level of the cores of said coil assemblies toward saturation comprising a permanent magnet, means mounting the magnet for movement relative to the coil assemblies, and driving means to move said magnet in response to advance of the count.

14. In a counting device, a transmitter having a plurality of number wheels registering the count and electrical signaling means associated with each number wheel for transmitting an electrical signal responsive to the rotated position thereof, a receiver having a plurality of number wheels corresponding to the number wheels of the transmitter, means including a yieldable drive for rotating the number wheels of the receiver, means associated with each number wheel of the receiver for controlling the rotation thereof connected to the electrical signaling means of the corresponding number wheel of the transmitter, and means for controlling rotation of all the number wheels of the receiver during a transfer operation connected to the electrical signaling means of the wheel of lowest order of the transmitter.

15. In a counting device, a transmitter having a plurality of number wheels registering the count and electrical signaling means associated with each number wheel for transmitting an electrical signal responsive to the rotated position thereof, a receiver having a plurality of number wheels corresponding to the number wheels of the transmitter, means including a yieldable drive for rotating the number wheels of the receiver, means associated with each number wheel of the receiver for controlling the rotation thereof comprising a plurality of circularly arranged solenoids connected to the electrical signaling means of the corresponding number wheel of the transmitter, locking means for preventing rotation of all the number wheels of the receiver, and means controlling the locking means responsive to the rotated position of the number wheel of lowest order of the transmitter.

16. In a counting device, a transmitter having a plurality of number wheels registering the count and electrical signaling means associated with each number wheel for transmitting an electrical signal responsive to the rotated position thereof, a receiver having a plurality of number wheels corresponding to the number wheels of the transmitter, means including a yieldable drive for rotating the number wheels of the receiver, means associated with each number wheel of the receiver for controlling the rotation thereof comprising a plurality of circularly arranged solenoids connected to the electrical signaling means of the corresponding number wheel of the transmitter, electrically controlled means engageable with the number wheels of the receiver to prevent advancement thereof, and means associated with the wheel of lowest order of the transmitter for actuating said electrically controlled means just prior to a transfer operation.

17. In a counting device, a receiver having a plurality of number wheels, means including a yieldable drive for rotating the number wheels, means for controlling the rotation of the number wheels including a plurality of circularly arranged sequentially energizable solenoids, and means for locking the number wheels during a transfer operation and releasing the number wheels subsequent to the transfer operation.

18. In a counting device, a receiver having a plurality of number wheels, means including a yieldable drive for rotating the number wheels, means for controlling the rotation of the number wheels including a plurality of circularly arranged sequentially energizable solenoids, releasable stop means for limiting rotation of the number wheel of lowest order, releasable stop means for preventing rotation of the number wheels of higher order, and a solenoid for controlling operation of the stop means.

19. In a counting device, a transmitter having a plurality of number wheels registering the count and electrical signaling means associated with each number wheel for transmitting an electrical current responsive to the rotated position thereof, a receiver having a plurality of number wheels corresponding to the number wheels of the transmitter, means including a yieldable drive for rotating the number wheels of the receiver, means associated with each number wheel of the receiver for controlling the rotation thereof comprising a plurality of circularly arranged solenoids connected to the electrical signaling means of the corresponding number wheel of the transmitter, means for locking the number wheels of the receiver, a control solenoid for controlling the operation of the last-named means, and means associated with the number wheel of lowest order of the transmitter for energizing the control solenoid just prior to a transfer operation.

20. In a receiver of a remote reading counter, a pair of rotatable number wheels of different order, means to rotate each number wheel in response to advance of the count including a yieldable drive, a pivoted lever, a resilient brake arm mounted on the lever and frictionally engageable with the number wheel of higher order, a stop member fixed to the number wheel of lower order for rotation therewith, a second arm on the lever obstructingly engageable with said stop member, and control means including a member engageable with said lever to simultaneously move the resilient brake arm into engagement with the number wheel of higher order and the second arm into stop member obstructing position.

21. In a receiver of a remote reading counter of the type having a rotatable number wheel and means to rotate the number wheel including a yieldable drive, means to control advancement of the number wheel in response to advance of the count comprising a plurality of circularly arranged sequentially energizable solenoids concentric with the axis of the number wheel, an armature on the number wheel for registry sequentially with the solenoids, said armature being mounted for movement toward and away from the solenoid in registry therewith, and means biasing the armature away from contact with the solenoids.

22. In a receiver of a remote reading counter of the type having a rotatable number wheel, and means to rotate the number wheel including a yieldable drive, means to control advancement of the number wheel in response to advance of the count comprising a plurality of circularly arranged sequentially energizable electromagnets disposed substantially concentric with the axis of the number wheel, and a resiliently mounted armature member mounted for rotation with the number wheel and having a portion movable relative to the number wheel into engagement with an energized electromagnet in registry therewith.

23. In a receiver of a remote reading counter, a rotatable number wheel including a cylindrical drum, means to rotate the number wheel including a yieldable drive, means to control advancement of the number wheel comprising a plurality of circularly arranged sequentially energizable solenoids mounted within the drum and facing the inner surface thereof, and an armature comprising a resilient arm fixed at one end to the inner surface of the drum and extending in a circumferential direction.

24. In a receiver of a remote reading counter, a rotatable number wheel, means to rotate the number wheel including a yieldable drive, a plurality of circularly arranged electromagnets disposed substantially concentric with the axis of the number wheel, circuit means to connect the electromagnets to a remote transmitter for the sequential energizing of the magnets, and an armature member comprising an elongated flexible body portion of resilient non-magnetizable material mounted at one end on the number wheel for rotation therewith and a relatively small electromagnet engageable portion of magnetizable metal carried at the other end of the body portion.

<center>No references cited.</center>